May 22, 1962     F. N. SINGDALE ET AL     3,036,283
LOAD CELL TRANSDUCER
Filed May 27, 1960
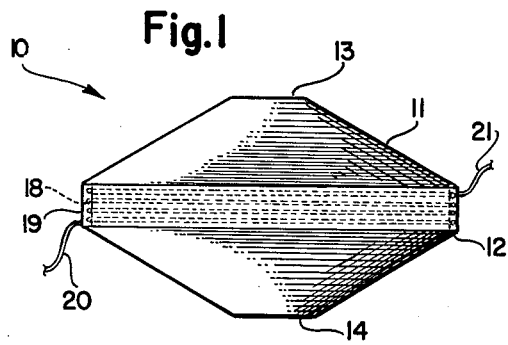
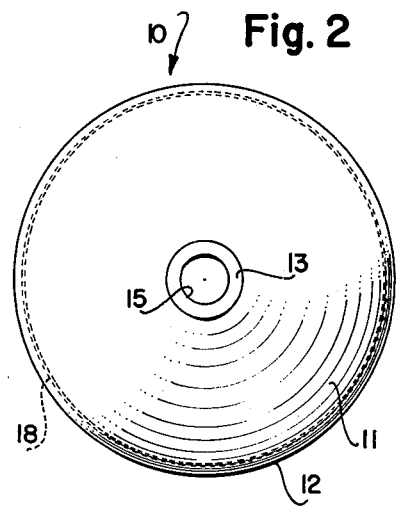
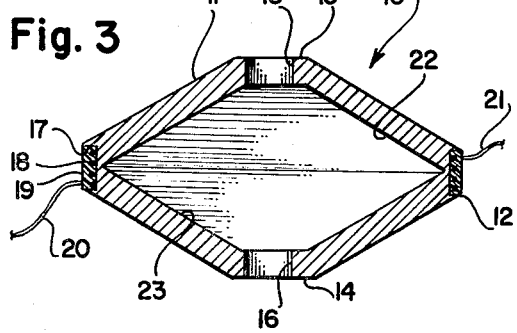
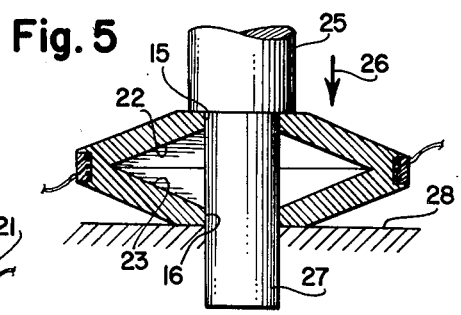
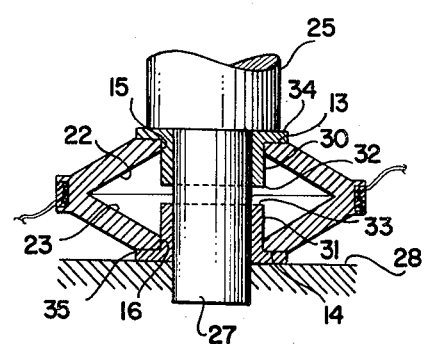
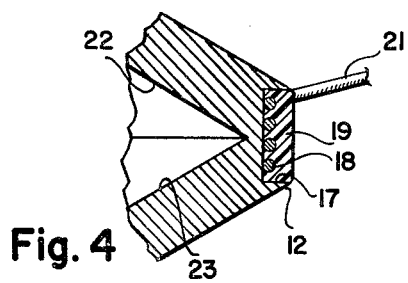
INVENTORS
FRED N. SINGDALE
GEORGE W. WEDEM
WALTER H. RIGHTER
By *A. M. Shapiro*
Attorney

3,036,283
LOAD CELL TRANSDUCER

Fred N. Singdale, Arcadia, George W. Wedemeyer, Azusa, and Walter H. Righter, Orange, Calif., assignors, by mesne assignments, to Lockheed Aircraft Corporation, Burbank, Calif., a corporation of California
Filed May 27, 1960, Ser. No. 32,153
9 Claims. (Cl. 338—5)

This invention relates to the field of force measurements and more particularly to a load cell transducer of the electrical resistance wire type.

In the measurement of axial compressive loads, it has been the conventional practice to employ transducers which are commonly known as being of a "washer" type. That is, a transducer which can be readily installed between the head of a bolt and the surface of a structural member in a fashion similar to a conventional washer. As the nut threadably engaged with the shank of the bolt is tightened, an axial compressive load is placed on the transducer. It has been found that in employing such transducers under load, the sides of the strain sensitive area of the washer transducer deform outwardly causing a change of resistance in the surrounding strain gage wire. This resistance change is directly proportional to the strain induced in the transducer as follows:

$$e \text{ equals } \frac{GP}{EA}$$

$e$ equals strain, inches/inch
$P$ equals applied load, pounds
$E$ equals modulus elasticity, p.s.i.
$A$ equals cross sectional area, inches square
$G$ equals proportionality constant, commonly called "gage factor"

The wire of the conventional washer type transducer may be incorporated into a common Wheatstone bridge circuit and used in the conventional manner for sensing axial mechanical loads, either compressive or tensile.

However, although a conventional device may operate efficiently for specific load ranges which are large in magnitude for some applications, it is obvious from the above equation that the cross sectional area must become quite small for a decreased loading if a reasonably large signal, or increased strain sensitivity is required. In many instances, this area becomes so small that the walls buckle indiscriminately into the load, causing non-linear response of the device to differential loads and in some extreme instances, complete destruction of the transducer is encountered.

The device of the present invention obviates the above difficulties by providing an increased signal proportional not only to the compressive stress in the cross sectional area, but also to the moment of load around the area. Furthermore, the unbalance moment also controls the direction of the deformation of the strain sensitive area causing it to squeeze in an outward direction only. This results in a linear response of the resistance wire to differential loading.

The present invention also prevents the complete destruction or breakdown of the transducer by providing cooperating loading sleeves which engage each other under extreme compressive axial loading to limit the flexure of the transducer and its maximum limits of performance.

Therefore, it is a principal object of the present invention to provide a light-weight sensing device for sensing and measuring axial compressive forces which is linear in output regardless of differential loading.

Another object of the present invention is to provide a load cell wherein an unusually large circumferential strain is produced in a local region of the cell under a tensile or compressive axial force.

Other objects of the invention and the various advantages and characteristics of the present load cell will be apparent from a consideration of the following detailed description when taken in connection with the accompanying drawings in which like numbers of reference denote corresponding parts throughout the several views; in which:

FIGURE 1 is a side elevational view of a load cell transducer in accordance with the present invention;
FIGURE 2 is a top view of the transducer shown in FIGURE 1;
FIGURE 3 is a sectional view of the transducer shown in FIGURE 1;
FIGURE 4 is an enlarged sectional view of a portion of the transducer of FIGURE 3;
FIGURE 5 is a sectional view of the present invention shown in a typical application under an axial compressive load; and
FIGURE 6 is a sectional view of the transducer shown in FIGURE 5 incorporating limit stop means employed to prevent destruction of the transducer under extreme loads.

With reference to FIGURES 1, 2 and 3, a load cell transducer 10 is shown constructed in accordance with the present invention. Load cell 10 comprises, in general, a hollow body 11 of a shape representative of a pair of right circular cones having their circular bases integrally formed to provide an annular midsection 12 and having their apexes lying on the central axis of the body. The apexes of the body are provided with broad flat annular load bearing surfaces 13 and 14 serving as the terminal ends of a load cell 10 to which is applied the axial compressive or tensile forces to be measured. Surfaces 13 and 14 are annular in configuration defining co-axial bores or openings 15 and 16, respectively, communicating the hollow interior of the body exteriorly of the load cell.

Midsection 12 is provided with an annular recess 17 for receiving at least one turn of strain gage wire 18. Strain gage wire 18 is a fine strain sensitive wire having an approximate diameter of 0.001 inch and is preferably cemented or bonded on the circumference of the body within the recess 17 by means of a conventional cement 19 such as Duco. Inasmuch as the strain gage wire is wound around the midsection of the body so that adjacent turns of wire may engage, it is preferred that insulated strain gage wire be employed. The insulation may take the form of an enamel painted coating or may be of woven cotton. It is to be understood that the windings of strain gage wire need not engage for some applications of this transducer and in this event insulated wire is not required. However, in this instance insulation should be provided about the circumference of the midsection of the body in order to electrically isolate the wire from the body. The opposite ends of the turns of strain gage wire terminate in leads 20 and 21 so that the wire may be coupled into one leg of a conventional Wheatstone bridge circuit.

In order to insure the adhesion of the strain gage wire to the body and to maintain the wire in position about the body, the Duco cement or other potting compound is employed to fill the recess covering the strain sensitive wire and forming an outer surface which is co-extensive with the general exterior surface of the body. The enlarged view of FIGURE 4 more clearly shows the arrangement of strain gage wire turns within the recess about the midsection of the body and the cement or potting compound which is employed to cover the strain gage wire and to maintain the wire in position about the midsection of the body. The plurality of turns of wire has a predetermined electrical resistance and this electrical resistance of the wire is changeable in response to the circumferential displacement of the body. Strain gage wire 18 is wound under tension circumscribing the midsection of the body and exerting a restricting force in the direction of the neutral axis which is symmetrical about an axis normal to the applied compressive force on the central vertical axis of the transducer. The strain sensitive wire 18 includes at least one complete turn, and in preferred practice comprises one or more complete turns to achieve the highest degree of linearity. To this extent fractional turns should be avoided.

The interior or hollow portion of the body is formed so that the inner wall surfaces 22 and 23 meet at the physical center of the body 11. About this annular area joining of wall surfaces, certain moments of the load are generated so that the strain sensitive wire, is responsive not only to the compressive stress in this area, but responsive to the moments of the load in this area. This configuration causes the direction of deformation to occur outwardly resulting in a linear response to differential loading. The embodiment of FIGURE 5 shows an application of the transducer to sense the axial applied load to surfaces 13 and 14 by a test rod or cylinder 25 moving in the direction of arrow 26. Cylinder 25 is provided with an extension 27 of reduced diameter which projects through bores 15 and 16 and further passes through a fixed structural member 28. Surface 14 of the transducer rests on the surface of member 28 while surface 13 is engaged by the lower end of the increased diameter of shaft 25 which applies a compressive load to the transducer. It is to be noted that a bolt and nut device may be employed in some applications wherein the shank of the bolt may be passed through bores 15 and 16.

With reference to FIGURE 6, the transducer of FIGURE 5 is incorporated having a pair of cooperating load sleeves 30 and 31 which operate to set the maximum compressive limit prior to destruction of the transducer while placed under an axial compressive load. Sleeves 30 and 31 are arranged to extend through bores 15 and 16 respectively so that their adjacent ends present opposed engageable surfaces 32 and 33 which when engaged set the limit of transducer flexure. On opposite ends of each sleeve from the end presenting surfaces 32 and 33, there is provided an annular flange 34 carried on sleeve 30 which seats on surface 13 and an annular flange 35 carried on sleeve 31 which seats on surface 14. Loads applied to the flanges are transmitted to the outwardly divergent sloping walls of the transducer body.

In actual operation, such as shown in FIGURE 6, an axial compressive force is applied to the bearing surfaces 13 and 14 located on opposite ends of the transducer either directly or through flanges 34 to the bearing surfaces. The compressive forces are transmitted through the sloping divergent walls of the body causing the midsection of the body to circumferentially expand producing a change of resistance in the wire by elongating the wire strain element 18. It is noted that the sloping divergent walls extending towards each other from opposite ends of the transducer body will flex about the midsection of the transducer which causes circumferential expansion of the body midsection. As the compressive axial force continues, the body walls will flex and tend to bend about the midsection until surfaces 32 and 33 on the loading sleeves 30 and 31 engage to prevent further compression of the transducer and thereby prevent its destruction should overloading by the compressive axial force continue. Upon release of the axial force, the walls of the transducer will expand or flex to return the transducer body to its original configuration.

Having described only typical forms of the invention we do not wish to be limited to the specific details herein set forth, but wish to reserve to ourselves any variations or modifications that may appear to those skilled in the art and fall within the scope of the following claims.

We claim:

1. An electro-mechanical force sensitive element comprising, a pair of right angle cones having their circular bases integrally joined to provide a hollow body and having the apexes lying on the central axis of the body, a flat, load-bearing surface at each apex, a circumferential recess about the midsection of the body, and a strain sensitive element bonded to the body within the recess for detecting circumferential strain produced in the body midsection when the ends of the body are subjected to an axial force.

2. An electro-mechanical force sensitive element comprising, a hollow body having flat load carrying surfaces provided on opposite ends of the body, the body including a pair of right angle cones having outwardly sloping walls of substantially constant thickness extending from the load carrying surfaces to terminate at a common circumferential recess opening exteriorly of the body about the midsection thereof, and a strain sensitive element bonded to the body within the recess for detecting circumferential strain produced in the body midsection when the end load carrying surfaces of the body are subjected to an axial force.

3. The invention as defined in claim 2 wherein the recess is completely filled with a potting compound covering the strain sensitive element and maintaining the element fixed to the body midsection to reflect any circumferential strain produced in the body midsection.

4. An electro-mechanical force sensitive element comprising, a hollow body having opposite load bearing surfaces and including a pair of right angle cones extending outwardly from the load bearing surfaces to join and terminate at the midsection of the body, the body midsection having a circumferential recess opening exteriorly of the body, a strain sensitive wire supported on and circumscribing the body midsection within the recess, bonding compound fixing the wire to the body midsection and filling the recess to form an outer surface co-extensive with the general exterior surface of the body, and the bonded wire adapted to sense circumferential strain produced in the midsection when the loading bearing surfaces are subjected to an axial force.

5. The invention as defined in claim 4 wherein the opposite load bearing end surfaces of the body are provided with a co-axial bore communicating the hollow of the body exteriorly.

6. The invention as defined in claim 5 including a pair of co-axial sleeves retained within the respective bores adapted to engage with each other to prevent compressive overloading of the force sensitive element.

7. An electro-mechanical force sensitive element comprising, a hollow body having opposite load bearing surfaces and including a pair of right angle cones extending from the load bearing surfaces to integrally terminate at a common midsection of the body, the body midsection having a circular recess opening exteriorly bonded to the body midsection within the recess for detecting circumferential strain produced in the body midsection when the end load bearing surfaces of the body are subjected to axial forces, and the opposite body ends having a co-axial bore communicating the hollow of the body exteriorly, a pair of co-axial sleeves retained within the respective bores having opposing end surfaces extending within the body hollow adapted to engage with each other to prevent compressive overloading of the force sensitive element.

8. An electro-mechanical force sensitive element comprising; a hollow circular body having outwardly divergent sloping imperforate walls from each end of the body, the sloping walls terminating at a central circumferential recess about the midsection of the body about which bending movements are produced, a strain sensitive element bonded to the body within the recess for detecting circumferential strain produced in the body midsection by the ends of the body are subjected to axial force, and means retained on the opposite ends of the body projecting into the hollow thereof for restricting maximum applied axial force.

9. An electro-mechanical force sensitive element comprising, a hollow body of circular cross section having flat load carrying surfaces provided on opposite ends of the body, the body including a pair of imperforate right angle cones of substantially constant thickness extending from the load carrying surfaces to terminate at an annular body midsection, the body midsection having a circumferential recess opening exteriorly of the body, the midsection characterized by its ability to circumferentially expand when the end load carrying surfaces of the body are subjected to axial force, and a strain sensitive element bonded to the body within the recess for detecting circumferential strain produced in the body midsection.

References Cited in the file of this patent

UNITED STATES PATENTS 2,636,964    Lancor _____ Apr. 28, 1953